United States Patent [19]

Ordoñez

[11] 4,062,592
[45] Dec. 13, 1977

[54] LIFTING MECHANISM FOR DUMP TRUCKS

[76] Inventor: Marino Pañeda Ordoñez, Cª de Oviedo - Pumarin, Gijon, Asturias, Spain

[21] Appl. No.: 720,456

[22] Filed: Sept. 3, 1976

[51] Int. Cl.² .............................................. B60P 1/04
[52] U.S. Cl. .................................................. 298/22 B
[58] Field of Search ............. 298/22 R, 22 C, 22 AE, 298/22 F, 22 J, 22 P, 22 A, 22 B, 22 D, 1 A, 17 D; 214/314, 501

[56] References Cited

U.S. PATENT DOCUMENTS 2,593,776  4/1952  Margala ............................ 298/22 B

FOREIGN PATENT DOCUMENTS 579,662  7/1958  Italy ................................. 298/22 B Primary Examiner—Frank E. Werner
Attorney, Agent, or Firm—Brady, O'Boyle & Gates

[57] ABSTRACT

The frame on which a dump truck load box is mounted is pivotally connected at one point to the truck main frame. A lifting arm or frame for the dump box frame is pivotally connected to the truck main frame at a second point on the main frame and also has a pivotal sliding connection with the dump box frame. A lift cylinder on the dump box frame and movable therewith is connected to the lifting arm or frame in such a manner that simple retraction of the cylinder longitudinally of the dump box frame will shift the latter to a steeply angled dumping position.

1 Claim, 2 Drawing Figures

LIFTING MECHANISM FOR DUMP TRUCKS

CROSS-REFERENCE TO RELATED APPLICATIONS

This application contains common subject matter with copending application Ser. No. 667,852, filed Mar. 18, 1976, for IMPROVEMENTS IN LIFTING MEMBERS FOR TRUCK BODIES AND SIMILAR UNITS; and application Ser. No. 720,457, filed Sept. 3, 1976, for STABILIZED LIFTING MECHANISM FOR DUMP TRUCKS.

BACKGROUND OF THE INVENTION

Various mechanisms are known in the art for raising and lowering the load boxes or bodies of dump trucks, including hydraulically operated mechanisms. Common deficiences in the prior art are excessive weight and bulkiness of the lifting mechanisms, complexity, and excessive cost. Therefore, the object of this invention is to improve on the known prior art by providing a more simplified, lighter weight, and less costly lifting mechanism for dump truck load boxes and their mounting frames, the improved mechanism being direct-acting and efficient in that it allows the use of a single hydraulic lift cylinder connected in such a way to the pivoted frame of the dump box and to the pivoted lifting arm that a simple retraction of the cylinder will raise the frame of the dump box to a steeply angled dumping position.

Other features and advantages of the invention will become apparent during the course of the following detailed description.

DETAILED DESCRIPTION

Figure 1:
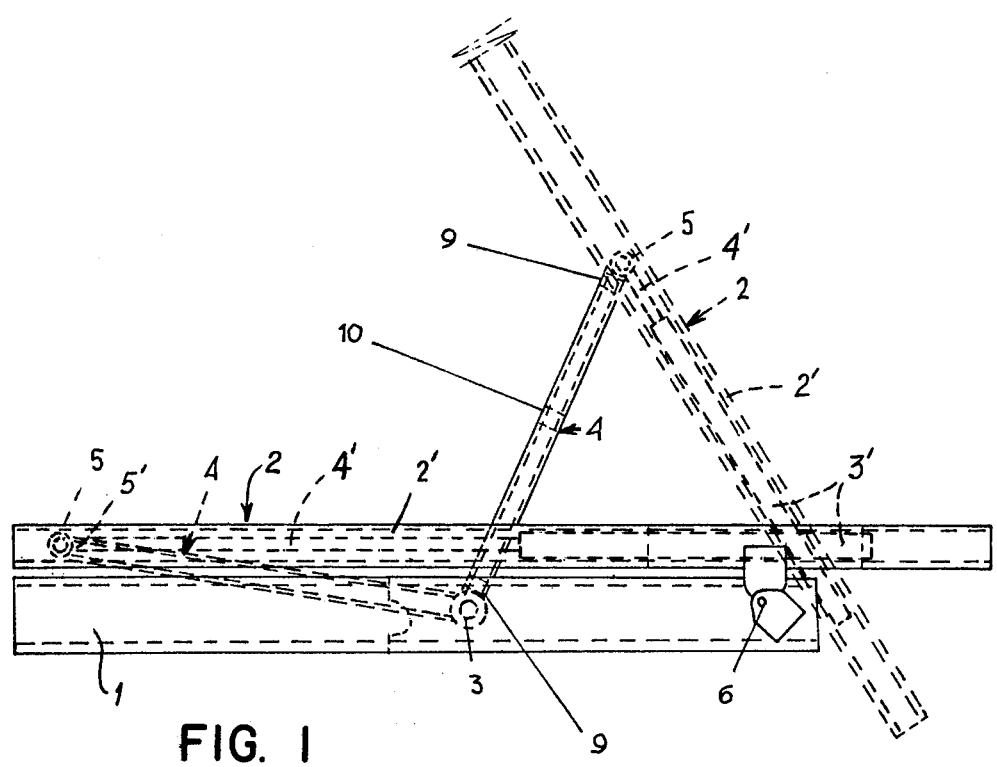
FIG. 1 is a side elevational view of a lifting mechanism for dump truck bodies embodying the invention showing the mechanism in dumping and non-dumping positions.
Figure 2:
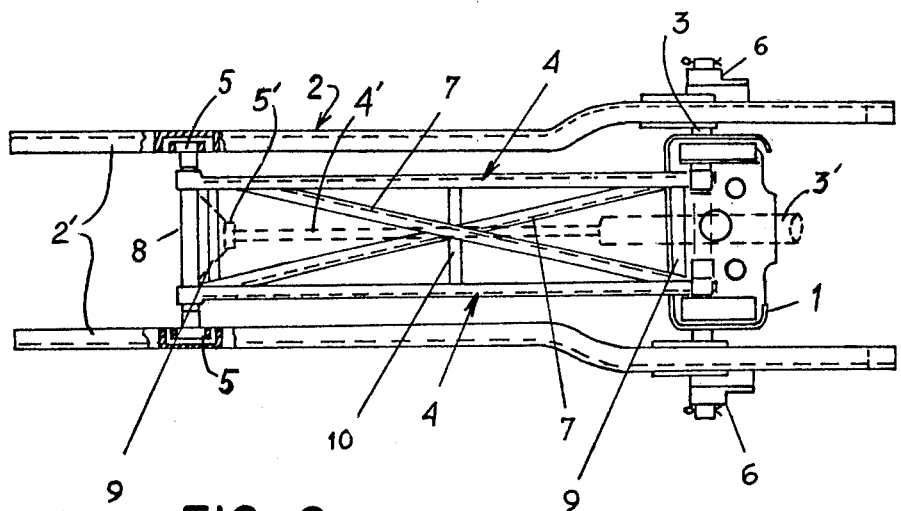
FIG. 2 is an end elevational view of the invention in the dumping position of the mechanism.

Referring to the drawings in detail wherein like numerals designate like parts, the reference numeral 1, FIG. 1, designates the main or chassis frame of a dump truck on which the invention is carried. All other constructional details of the truck are omitted in the drawings for simplicity of illustration.

A support frame 2 for the truck dump box, not shown, is pivotally attached at one point by a fixed pivot means 6 to the underlying truck main frame 1, whereby the dump box frame 2 can be raised and lowered pivotally between steeply inclined and level dumping and non-dumping positions, as illustrated in FIG. 1.

A comparatively shorter lifting arm or frame 4 for the dump box frame 2 is arranged forwardly thereof with one end pivotally attached at 3 to the truck main frame 1 well forwardly of the pivot point 6 for dump box frame 2. The other end of the lifting frame 4 has a pivotal and sliding or rolling connection with the two parallel side members 2' of dump box frame 2, as illustrated at 5 in the drawings.

A central longitudinal hydraulic lifting cylinder 3' has its cylinder body attached to the dump box frame 2 fixedly, and the extensible and retractable rod 4' of the cylinder 3' is pivotally connected at 5' to a cross member 8 forming one end of the lifting frame 4. The simple arrangement is such that extension of the cylinder rod 4' by conventional hydraulic pressure on the cylinder piston will swing the lifting frame 4 to a down slightly inclined position illustrated in FIG. 1 ahead of the pivot 3, and will simultaneously swing the dump box frame 2 to a down or non-dumping level position parallel with the truck main frame 1.

Similarly, a simple retraction of the rod 4' will swing the lifting frame 4 to a comparatively upright and somewhat rearwardly inclined position, FIG. 1, while simultaneously raising the dump box frame 2 to a steeply inclined dumping position of at least 60° above the horizontal.

The described mechanism is compact and lightweight compared to the known prior art, is less costly and more direct and efficient in operation.

A further aspect of the invention is the formation of the rigid lifting frame or arm 4 as a wide unit for lateral stability to reduce twisting during operation under heavy loading. To accomplish this, the lifting frame 4 has a pair of longitudinally extending side frame members interconnected by an X brace 7 extending the length of said rectangular frame and having their opposite ends connected to corresponding ends of the longitudinally extending side frame members, and end and intermediate brace bars 9 and 10 extending transversely between the longitudinally extending side frame members.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A lifting mechanism for truck bodies and the like in combination with a pair of laterally spaced longitudinal stationary frame members, a dump frame including a pair of laterally spaced longitudinal track members pivotally connected to said stationary frame members adjacent one end thereof, said longitudinal track members disposed in a plane immediately above and parallel to the plane of said longitudinal stationary frame members, a rectangular frame stabilizer assembly positioned between and spanning the lateral distance between said laterally spaced longitudinal track members, a pair of pivot connections connecting the opposite sides of said rectangular frame at a position forwardly of the pivotal connection of the dump frame to said stationary frame, a pair of connectors on the opposite sides of the ends of said rectangular frame stabilizer assembly engaged for sliding movement in said pair of laterally spaced longitudinal track members, an extensible lift cylinder connected between the dump frame and the rectangular frame stabilizer assembly, the cylinder portion of said lift cylinder being fixedly connected to the dump frame, and the rod portion of the lift cylinder being pivotally connected to the rectangular frame stabilizer assembly at a position adjacent said pair of slidable connectors, whereby upon retraction of said lift cylinder said dump frame is moved about its pivot connection to said stationary frame members from a horizontal position to a raised dump position, and an X brace extending the length of said rectangular frame stabilizer assembly, the opposite ends of said X brace being rigidly connected to corresponding ends of the longitudinally extending members of said rectangular frame, end and intermediate brace bars extending transversely between said longitudinally extending members, thereby providing a rigid lifting frame to reduce twisting during operation under heavy load.

* * * * *